United States Patent
Morihara et al.

(10) Patent No.: US 8,245,410 B1
(45) Date of Patent: Aug. 21, 2012

(54) VIRTUAL CUTTING TOOL PROJECTION DEVICE USED WITH CUTTING TOOLS

(75) Inventors: Richard Hiroaki Morihara, Bellevue, WA (US); Sidlaghatta N. Venkatesh, Renton, WA (US); Matthew A. Byrne, Ann Arbor, MI (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 12/949,274

(22) Filed: Nov. 18, 2010

(51) Int. Cl.
*G01B 11/27* (2006.01)

(52) U.S. Cl. .................................... 33/286; 33/DIG. 21

(58) Field of Classification Search .............. 33/286, 33/613, 628, 636, 638, 639, 642, 645, DIG. 21
See application file for complete search history.

(56) References Cited

U.S. PATENT DOCUMENTS

| | | | |
|---|---|---|---|
| 5,588,216 A * | 12/1996 | Rank et al. | 33/286 |
| 6,473,980 B2 * | 11/2002 | Ripingill et al. | 33/286 |
| 6,898,860 B2 * | 5/2005 | Wu | 33/286 |
| 2005/0132589 A1 * | 6/2005 | Johnson | 33/286 |
| 2007/0056174 A1 * | 3/2007 | Bascom et al. | 33/286 |
| 2009/0211105 A1 * | 8/2009 | Glaser | 33/286 |
| 2009/0260239 A1 * | 10/2009 | Cerwin | 33/286 |
| 2011/0265336 A1 * | 11/2011 | Bascom et al. | 33/286 |

OTHER PUBLICATIONS

LaserKerf II; http://www.laserkerf.com; 4 pages.
Drill Press Laser Pointer; http://www.instructables.com/id/Drill-Press-Laser-Pointer; 1 page.
Craftsman Drill Press Laser Attachment; http://www.sears.com/shc/s/p_10153_12605_00921920000P?keyword+laser=drill; 1 page.
17" Laser Drill Press; http://www.deltaportercable.com/products/ProductDetail.aspx?ProductID=15685#; 1 page.

* cited by examiner

*Primary Examiner* — G. Bradley Bennett
(74) *Attorney, Agent, or Firm* — Armstrong Teasdale LLP

(57) ABSTRACT

A method and system are provided for projecting a virtual cutting tool. A housing has a longitudinal axis and includes a first opening and a second opening. A first laser is housed within the first opening and is disposed to emit a first visible light that is substantially parallel to the longitudinal axis. A second laser is housed within the second opening and is disposed to emit a second visible light that is non-parallel to the longitudinal axis such that the second visible light intersects the first visible light at a predetermined distance from the housing.

20 Claims, 6 Drawing Sheets

VIRTUAL CUTTING TOOL PROJECTION DEVICE USED WITH CUTTING TOOLS

BACKGROUND

The present disclosure relates generally to cutting tools and more specifically to a laser-based virtual cutting tool projection device.

At least some known cutting tools are used to cut and/or alter a shape of materials. Operational errors related to known cutting tools could lead to scrapping expensive materials and/or disrupting production schedules. Moreover, trying to avoid such operational errors could be time-consuming and/or labor intensive. To facilitate reducing a likelihood of committing operational errors, at least some known cutting tools include a laser that enables a centerline and/or an edge of the cutting tool to be visually estimated and/or projected onto the material before actually cutting and/or altering the material. However, lasers of known cutting tools are generally limited to providing visual estimates in one or two dimensions.

BRIEF DESCRIPTION

In one aspect, a method is provided for projecting a virtual cutting tool using a device having a longitudinal axis. The method includes emitting from a first laser a first visible light that is substantially parallel to the longitudinal axis. A second visible light that is non-parallel to the longitudinal axis is emitted from a second laser such that the second visible light intersects the first visible light at a predetermined distance from the device.

In another aspect, a virtual cutting tool projection device having a longitudinal axis is provided. The device includes a first laser and a second laser. The first laser is disposed to emit a first visible light that is substantially parallel to the longitudinal axis. The second laser is disposed to emit a second visible light that is non-parallel to the longitudinal axis such that the second visible light intersects the first visible light at a predetermined distance from the device.

In yet another aspect, a system is provided for projecting a virtual cutting tool. The system includes a housing, a first laser, and a second laser. The housing has a longitudinal axis and includes a first opening and a second opening. The first laser is housed within the first opening and is disposed to emit a first visible light that is substantially parallel to the longitudinal axis. The second laser is housed within the second opening and is disposed to emit a second visible light that is non-parallel to the longitudinal axis such that the second visible light intersects the first visible light at a predetermined distance from the housing.

The features, functions, and advantages that have been discussed can be achieved independently in various embodiments of the present invention or may be combined in yet other embodiments further details of which can be seen with reference to the following description and drawings.

DETAILED DESCRIPTION

The subject matter described herein relates generally to cutting tools and, more specifically, to a laser-based virtual cutting tool projection device used with cutting tools. The virtual cutting tool projection device enables a cutting tool center point, a cutting tool diameter, a cutting tool cutting depth, and/or a distance between the cutting tool and a target object to be visually verified before the target object is cut and/or altered using the cutting tool. In one embodiment, the virtual cutting tool projection device includes at least a first laser and a second laser. In such an embodiment, the first laser emits a first visible light that is substantially parallel to a longitudinal axis of the device, and the second laser emits a second visible light that is skew to the longitudinal axis such that the second visible light intersects the first visible light at a predetermined distance from the device.

As used herein, an element or step recited in the singular and proceeded with the word "a" or "an" should be understood as not excluding plural elements or steps unless such exclusion is explicitly recited. Furthermore, references to "one embodiment" or "the exemplary embodiment" of the present invention are not intended to be interpreted as excluding the existence of additional embodiments that also incorporate the recited features.

Figure 1:
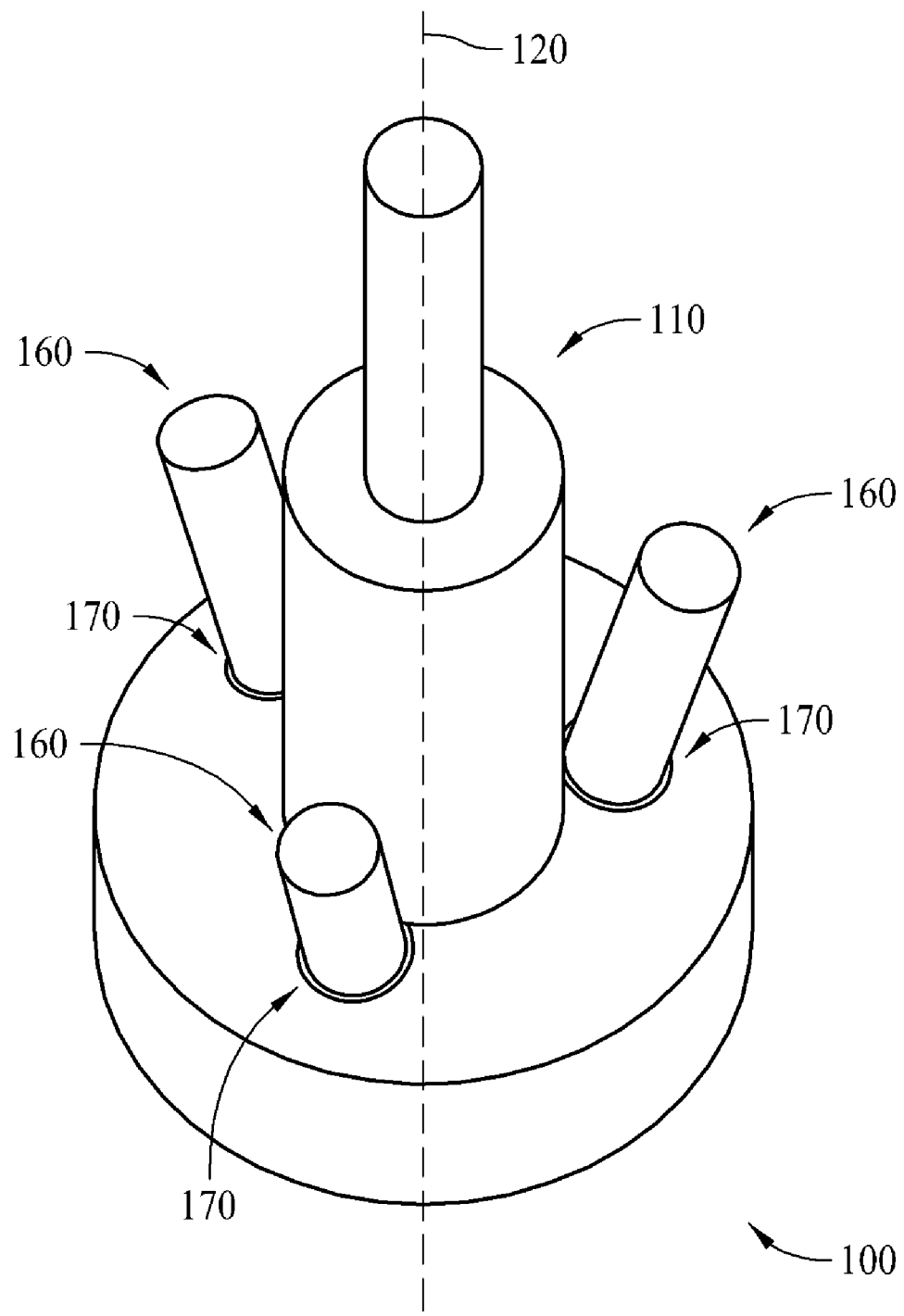
FIG. 1 is a top perspective view of an exemplary system for use with a cutting tool, the exemplary system including a housing, a first laser, and at least one second laser.
Figure 2:
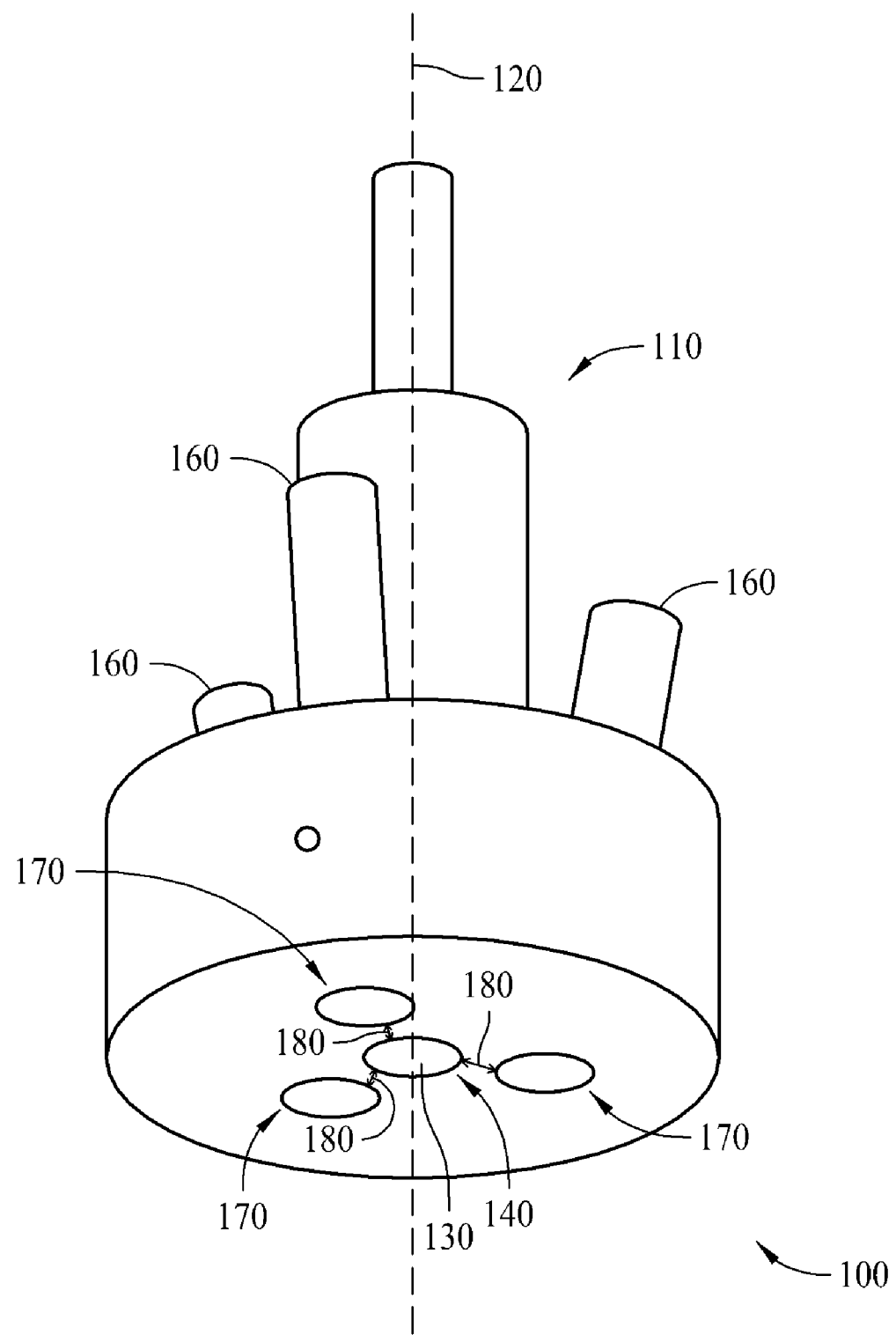
FIG. 2 is a bottom perspective view of the system shown in FIG. 1.

FIGS. 1 and 2 illustrate an exemplary system 100 for use in projecting a virtual cutting tool for use with a cutting tool holder (not shown). Specifically, FIG. 1 is a top perspective view of system 100, and FIG. 2 is a bottom perspective view of system 100. In the exemplary embodiment, system 100 includes a housing 110 having a longitudinal axis 120 that extends axially through housing 110.

In the exemplary embodiment, system 100 is coupleable to a cutting tool holder, such as found on a computer numerical control (CNC) machine (not shown) that is configured to move system 100 relative to longitudinal axis 120. For example, in the embodiment, the CNC machine is configured to move housing 110 along longitudinal axis 120 to simulate a drilling movement. Moreover, in the exemplary embodiment, the CNC machine is configured to rotate housing 110 about longitudinal axis 120. In one embodiment, the CNC machine is configured to move housing 100 transverse to longitudinal axis 120 to simulate a routing and/or milling movement. Alternatively, system 100 may be coupled to any device that enables system 100 to function as described herein.

In the exemplary embodiment, a first laser 130 is positioned within a first opening 140 defined in housing 110. In the exemplary embodiment, first opening 140 is defined near longitudinal axis 120. More specifically, in the exemplary embodiment, first opening 140 is aligned substantially concentrically with respect to housing 110 and/or along longitudinal axis 120 to enable first laser 130 to emit a first visible light 150 substantially parallel to and/or substantially along longitudinal axis 120. Alternatively, first opening 140 may be defined offset a distance from longitudinal axis 120 such that first visible light 150 emitted from first laser 130 is offset a distance from longitudinal axis 120, but remains emitted in a direction that is substantially parallel to longitudinal axis 120.

Moreover, in the exemplary embodiment, a second laser 160 is positioned within a second opening 170 defined in housing 110. In the exemplary embodiment, second opening 170 is defined a distance 180 from longitudinal axis 120. More specifically, in the exemplary embodiment, second opening 170 is oriented in a direction that is non-parallel to longitudinal axis 120 to enable second laser 160 to emit a second visible light 190 at a predetermined angle 200 relative to longitudinal axis 120 such that second visible light 190 intersects first visible light 150 and/or longitudinal axis 120 at a predetermined distance 210 from system 100 or, more specifically, housing 110. For example, second laser 160 may be positioned and/or oriented to ensure that axial distance 210 is approximately two inches from housing 110. In such an embodiment, the intersection of first and second visible lights 150 and 190 at axial distance 210 represents a virtual projection of a 2" cutting tool. In the exemplary embodiment, first visible light 150 is emitted at a first wavelength to have a first color, and second visible light 190 is emitted at a second wavelength to have a second color that is different from the first color.

In the exemplary embodiment, housing 110 includes a plurality of second openings 170 that each houses a respective second laser 160 therein. Moreover, in the exemplary embodiment, second openings 170 are spaced radially about longitudinal axis 120 such that second visible light 190 emitted by each respective second laser 160 intersects the first visible light and/or longitudinal axis 120 at approximately the same axial distance 210 as measured from housing 110. Alternatively, second visible lights 190 emitted from various second lasers 160 intersect first visible light 150 and/or longitudinal axis 120 at varying axial distances 210 measured from housing 110. In such an embodiment, each second laser 160 may emit different colors such that an intersection of a first color emitted with longitudinal axis 120 is indicative of a cutting tool having a first size and an intersection of a second color emitted with longitudinal axis 120 is indicative of a cutting tool having a second size.

In one embodiment, an adjusting mechanism (not shown) enables distance 180 and/or angle 200 to be selectively adjusted to enable second visible light 190 to intersect first visible light 150 at a desired distance 210 from housing 110. In another embodiment, a second housing 110 may include a second opening 170 formed at a second position and/or orientation that enables second visible light 190 to intersect first visible light 150 and/or longitudinal axis 120 at a second predetermined axial distance 210. In such an embodiment, different housings 110 may be selected based on a desired axial distance 210.

Figure 3:
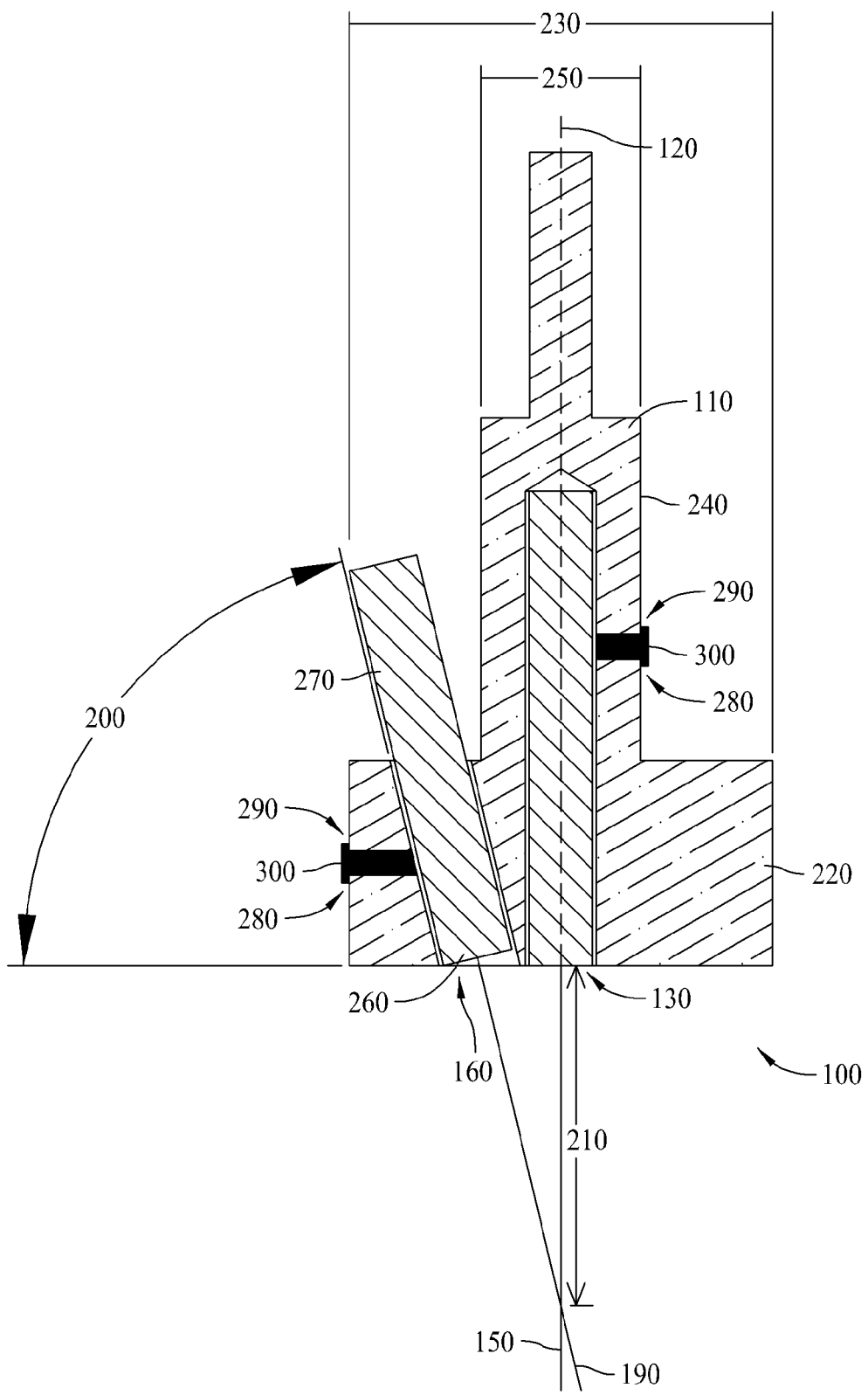
FIG. 3 is a cross-sectional view of the housing shown in FIG. 1.

FIG. 3 illustrates a cross-sectional view of housing 110. In the exemplary embodiment, housing 110 includes a first portion 220 formed with a first diameter 230 and a second portion 240 formed with a second diameter 250 that is smaller than first diameter 230. In the exemplary embodiment, a first section 260 of second laser 160 is housed within second opening 170, and a second section 270 of second laser 160 extends outward from second opening 170 such that second laser 160 extends a distance outward from housing 110. As such, second laser 160 or, more specifically, laser second section 270 is accessible to enable a user to selectively adjust an operational command of second laser 160 including, without limitation, on and off actuation and/or color adjustments.

In the exemplary embodiment, system 100 includes a securing mechanism 280 that enables first laser 130 and/or second laser 160 to be selectively retained within housing 110. In the exemplary embodiment, securing mechanism 280 is formed with an opening 290 that extends through housing 110 and a screw 300 that is threadedly coupled within opening 290 for use in securing first laser 130 and/or second laser 160. Alternatively, first laser 130 and/or second laser 160 may be secured within housing 110 using any suitable securing mechanism 280 that enables system 100 to function as described herein.

During operation of system 100, first laser 130 emits a first visible light 150 in a direction that is substantially parallel to longitudinal axis 120. In the exemplary embodiment, second laser 160 emits a second visible light 190 that is non-parallel or skew to longitudinal axis 120 such that second visible light 190 intersects first visible light 150 at axial distance 210 from housing 110. The intersection of the first and second visible lights is representative of a "penetration point" of the cutting tool. As described herein, the "penetration point" represents an axial distance 210 at which a cutting tool is projected to enter a target object.

Figure 4:
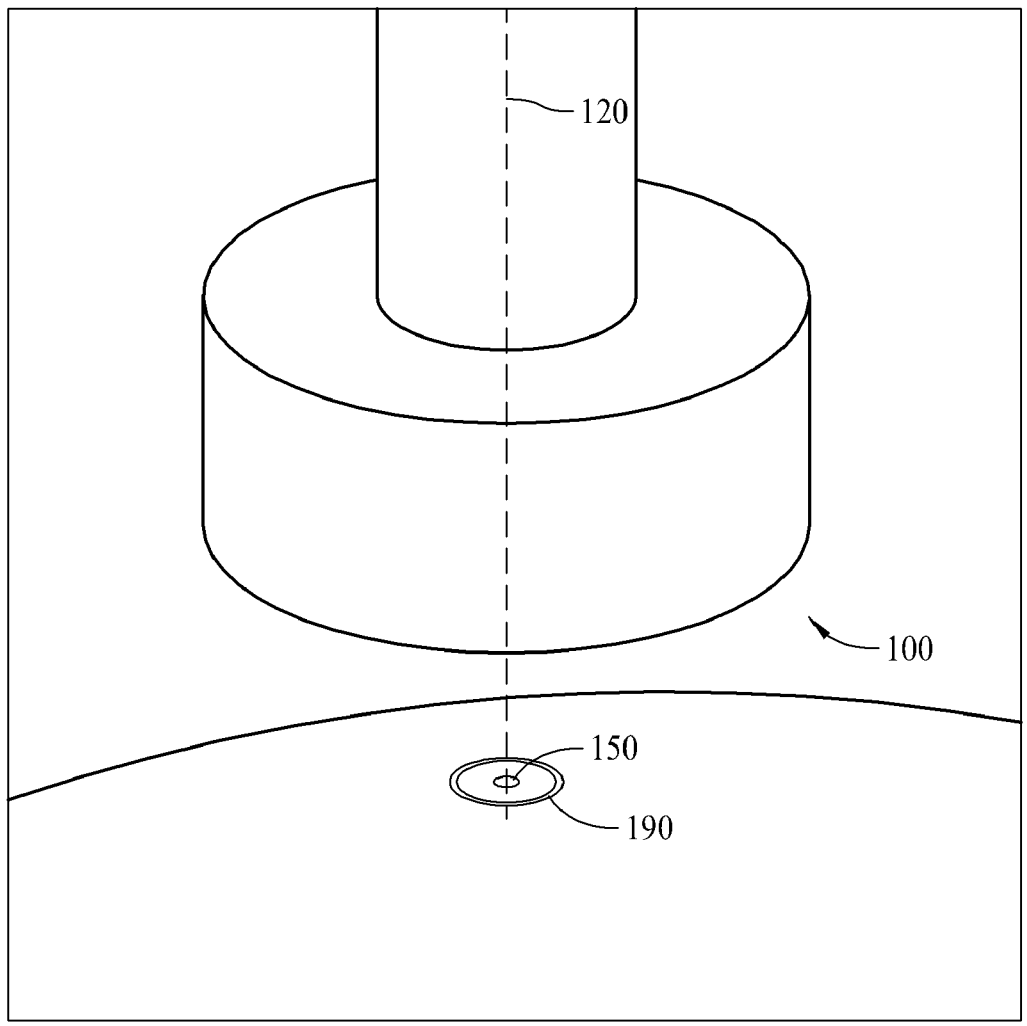
FIG. 4 is a perspective view of the system shown in FIG. 1 and positioned above a penetration point.
Figure 5:
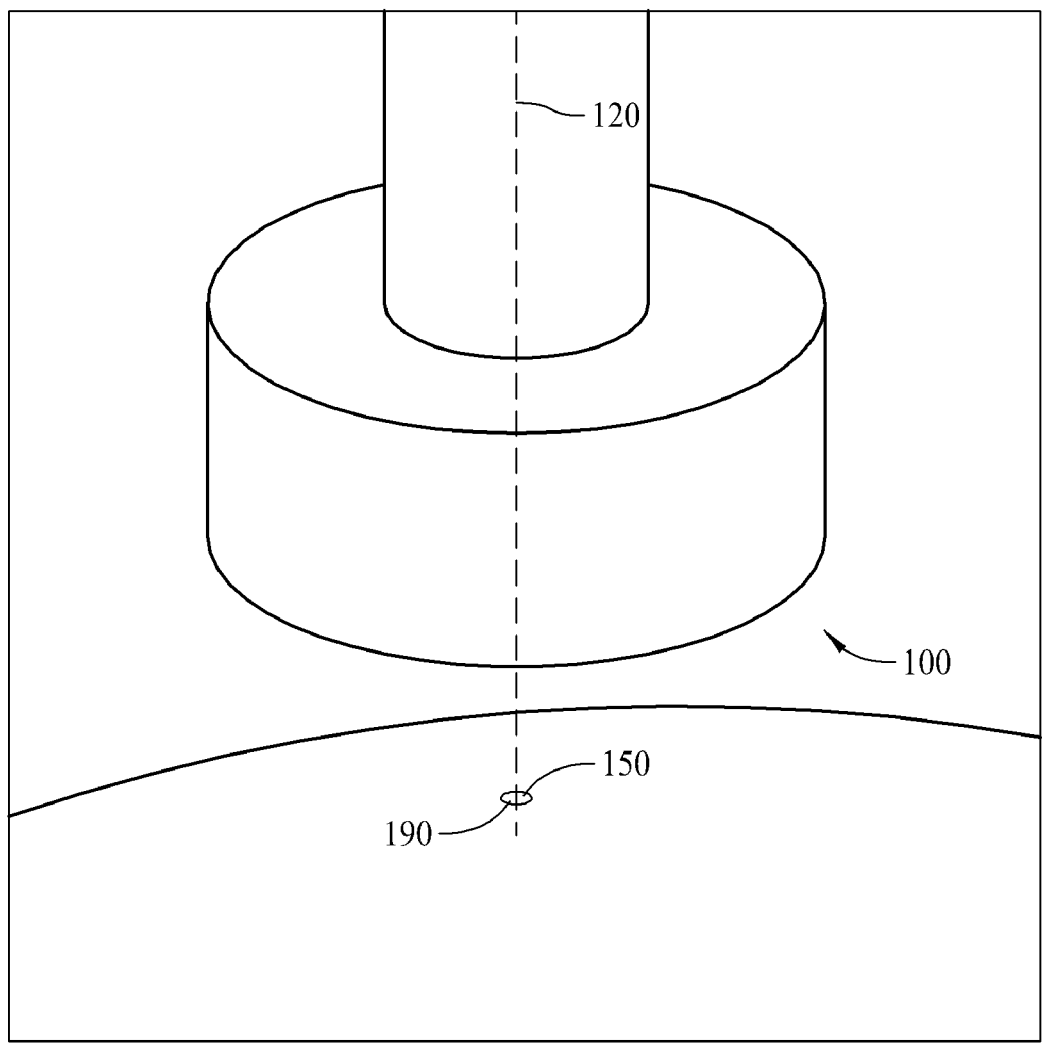
FIG. 5 is a perspective view of the system shown in FIG. 1 and positioned at the penetration point.
Figure 6:
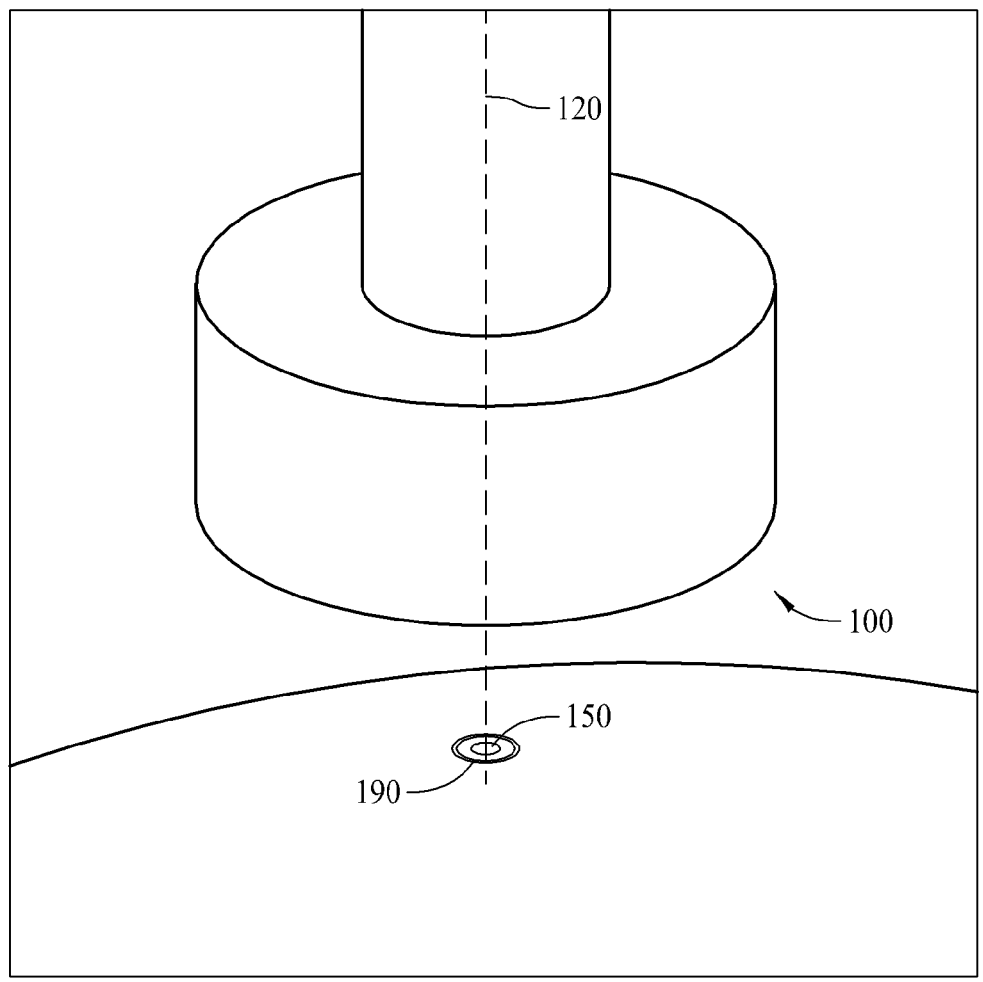
FIG. 6 is a perspective view of the system shown in FIG. 1 and positioned below the penetration point.

FIGS. 4-6 illustrate various operating phases of system 100. More specifically, FIG. 4 is a perspective view of system 100 positioned above the penetration point, FIG. 5 is a perspective view of system 100 positioned at the penetration point, and FIG. 6 is a perspective view of system 100 positioned below the penetration point.

In the exemplary embodiment, housing 110 is rotatable about longitudinal axis 120 to enable first laser 130 and/or second laser 160 to emit a visible light on the target object. More specifically, in the exemplary embodiment, first laser 130 is aligned substantially coaxially within housing 110 and/or with respect to longitudinal axis 120 such that first visible light 150 is projected as a point when housing 110 rotates about longitudinal axis 120. In such an embodiment, the point emitted by first laser 130 enables a path of the cutting tool to be visually verified. In another embodiment, first laser 130 is offset a distance from longitudinal axis 120 such that first visible light 150 is projected as a first circle with a size that is substantially similar to the radial size of the cutting tool as housing 110 rotates about longitudinal axis 120. In such an embodiment, first visible light 150 emitted by first laser 130 enables a path and/or a radial size of the cutting tool to be visually verified. Because first laser 130 is aligned along and/or parallel to longitudinal axis 120, the shape and/or size of first visible light 150 emitted by first laser 130 remains substantially constant as housing 110 moves axially along longitudinal axis 120.

Moreover, in the exemplary embodiment, system 100 is movable axially along longitudinal axis 120 to enable second laser 160 to emit a second visible light 190 on the target object that is projected as a second circle with a size that is proportional to axial distance 210. As shown in FIG. 4, when housing 110 is positioned above the penetration point, second visible light 190 is projected as a second circle that encircles first visible light 150. As housing 110 is lowered toward the penetration point, the second circle decreases in size until, as shown in FIG. 5, housing 110 is positioned at the penetration point and second visible light 190 is projected as a point that is substantially similar to first visible light 150. As housing 110 is lowered beyond the penetration point, second visible light 190 is projected as a second circle that encircles first visible light 150, as shown in FIG. 6, and the second circle increases in size. As such, in such an embodiment, second visible light 190 emitted by second laser 160 enables an axial length and/or a penetration point of a cutting tool to be visually verified.

The above-described systems and methods provide a laser-based virtual cutting tool projection device that enables a cutting tool and/or a cutting path to be quickly and accurately projected without cutting the target object. More specifically, the embodiments described herein enable a cutting tool to be projected in three dimensions including projecting a center point, a cutting tool diameter, a cutting tool cutting depth, and/or a distance between the cutting tool and the target object. Accordingly, the embodiments described herein facilitate reducing a likelihood of committing operational errors, thereby enabling a target object to be confidently cut and/or altered and reducing manufacturing time and costs.

The exemplary systems and methods are not limited to the specific embodiments described herein, but rather, components of each system and/or steps of each method may be utilized independently and separately from other components and/or method steps described herein. Each component and each method step may also be used in combination with other components and/or method steps.

This written description uses examples to disclose certain embodiments of the invention, including the best mode, and also to enable any person skilled in the art to practice those certain embodiments, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for projecting a virtual cutting tool using a device having a longitudinal axis, said method comprising:
    emitting from a first laser a first visible light that is substantially parallel to the longitudinal axis; and
    enabling a penetration point of the virtual cutting tool to be visually verified by emitting from a second laser a second visible light that is non-parallel to the longitudinal axis such that a point of intersection of the second visible light with the first visible light is a predetermined distance from the device, and wherein the point of intersection identifies the penetration point of the virtual cutting tool.

2. A method in accordance with claim 1 further comprising moving the device one of along the longitudinal axis and transverse to the longitudinal axis.

3. A method in accordance with claim 1 further comprising rotating the device about the longitudinal axis.

4. A method in accordance with claim 1 further comprising adjusting an angle of the second laser such that the second visible light intersects the first visible light at a desired distance from the device.

5. A method in accordance with claim 1 further comprising adjusting a distance between the first laser and the second laser such that the second visible light intersects the first visible light at a desired distance from the device.

6. A virtual cutting tool projection device having a longitudinal axis, said device comprising:
    a first laser disposed to emit a first visible light that is substantially parallel to the longitudinal axis; and
    a second laser disposed to emit a second visible light that is non-parallel to the longitudinal axis such that a point of intersection of the second visible light with the first visible light is a predetermined distance from said device to enable a penetration point of the virtual cutting tool to be visually verified, wherein the point of intersection identifies the penetration point of the virtual cutting tool.

7. A device in accordance with claim 6, wherein said first laser is selectively positioned to be one of coaxial with the longitudinal axis and offset from the longitudinal axis.

8. A device in accordance with claim 6, wherein an angle of said second laser is selectively adjustable such that the second visible light intersects the first visible light at a desired distance from said device.

9. A device in accordance with claim 6, wherein a distance between said first laser and said second laser is selectively adjustable such that the second visible light intersects the first visible light at a desired distance from said device.

10. A device in accordance with claim 6, wherein the first visible light has a first wavelength, and the second visible light has a second wavelength.

11. A system for projecting a virtual cutting tool, said system comprising:
    a housing having a longitudinal axis, said housing comprising a first opening and a second opening;
    a first laser housed within said first opening, said first laser disposed to emit a first visible light that is substantially parallel to the longitudinal axis; and
    a second laser housed within said second opening, said second laser disposed to emit a second visible light that is non-parallel to the longitudinal axis such that a point of intersection of the second visible light the first visible light is a predetermined distance from said housing to enable a penetration point of the virtual cutting tool to be visually verified, wherein the point of intersection identifies the penetration point of the virtual cutting tool.

12. A system in accordance with claim 11, wherein said housing is selectively movable one of along the longitudinal axis and transverse to the longitudinal axis.

13. A system in accordance with claim 11, wherein said housing is rotatable about the longitudinal axis.

14. A system in accordance with claim 11, wherein said housing comprises a first portion having a first diameter, and a second portion having a second diameter.

15. A system in accordance with claim 11, wherein at least a portion of at least one of said first laser and said second laser protrudes out of said housing.

16. A system in accordance with claim 11, wherein said first laser is selectively positionable to be one of coaxial with the longitudinal axis and offset from the longitudinal axis.

17. A system in accordance with claim 11 further comprising a securing mechanism that is configured to secure at least one of said first laser and said second laser.

18. A system in accordance with claim 11 further comprising an adjusting mechanism that is configured to adjust an angle of said second laser such that the second visible light intersects the first visible light at a desired distance from said housing.

19. A system in accordance with claim 11 further comprising an adjusting mechanism that is configured to adjust a distance between said first laser and said second laser such that the second visible light intersects the first visible light at a desired distance from said housing.

20. A system in accordance with claim 11, wherein the first visible light has a first wavelength, and the second visible light has a second wavelength.

* * * * *